United States Patent
Atkinson et al.

(10) Patent No.: US 10,520,369 B2
(45) Date of Patent: Dec. 31, 2019

(54) TEMPERATURE ESTIMATION

(71) Applicants: Gary W. Atkinson, Freehold, NJ (US); Dayu Huang, Rexford, NY (US)

(72) Inventors: Gary W. Atkinson, Freehold, NJ (US); Dayu Huang, Rexford, NY (US)

(73) Assignee: ALCATEL-LUCENT USA INC., Murray Hill, NJ (US)

( * ) Notice: Subject to any disclaimer, the term of this patent is extended or adjusted under 35 U.S.C. 154(b) by 1038 days.

(21) Appl. No.: 14/182,747

(22) Filed: Feb. 18, 2014

(65) Prior Publication Data

US 2015/0233772 A1   Aug. 20, 2015

(51) Int. Cl.
*G01K 17/00* (2006.01)
*G01K 7/42* (2006.01)

(52) U.S. Cl.
CPC .................... *G01K 7/427* (2013.01)

(58) Field of Classification Search
CPC ............ G01K 7/427; F24F 2011/0058; G05B 2219/2614; G06F 17/30598
See application file for complete search history.

(56) References Cited

U.S. PATENT DOCUMENTS

| | | | | |
|---|---|---|---|---|
| 8,611,586 B1 * | 12/2013 | Brodeur | ............... | G06K 9/3241 382/100 |
| 9,280,593 B1 * | 3/2016 | Dykstra | ............... | G06F 16/285 |
| 9,462,422 B1 * | 10/2016 | Blaha, Jr. | ............... | H04W 4/025 |
| 2012/0330626 A1 * | 12/2012 | An | ............... | G01K 17/20 703/2 |
| 2013/0231906 A1 * | 9/2013 | Luvalle | ............... | G01W 1/10 703/2 |
| 2015/0019468 A1 * | 1/2015 | Nugent | ............... | G06N 3/063 706/25 |
| 2016/0097679 A1 * | 4/2016 | Jung | ............... | G01J 5/025 702/3 |

OTHER PUBLICATIONS

Sala et al., A statistical method to downscale temperature forecasts. A case study in Catalonia, 2000, p. 75-82.*
Cano et al., Clustering Methods for Statistical Downscaling in Short-Range Weather Forecasts, 2003, p. 2169-2183.*

(Continued)

*Primary Examiner* — Mohammad K Islam
(74) *Attorney, Agent, or Firm* — Carlson, Gaskey & Olds, P.C.

(57) ABSTRACT

An illustrative method of estimating a temperature for at least one of a plurality of sites based on temperature information from at least one of a plurality of temperature measurement stations includes several steps. The sites are clustered into a plurality of clusters. Respective centroids for the clusters are determined. The centroids are associated with respective measurement stations. One of a preselected plurality of estimating techniques is respectively assigned to the measurement stations. The assigned estimating technique provides a temperature estimate at the measurement station that is more accurate than others of the preselected plurality of estimating techniques. A temperature at the at least one of the plurality of sites is estimated using the estimating technique assigned to the measurement station associated with the centroid of the cluster that includes the site of interest.

20 Claims, 2 Drawing Sheets

(56) References Cited

OTHER PUBLICATIONS

Bolstad et al., Measured and predicted air temperatures at basin to regional scales in the southern Appalachian mountains, 1998.*

Alcatel-Lucent, "EPB and Alcatel-Lucent Bell Labs putting the smarts into Chattanooga's Smart Grid," Press Release May 2011, http://www.tmcnet.com/usubmit/2011/05/31/5544240.htm.

O.S. Popescu, N.E. Mastorakis, and L.N. Popescu-Perescu, "Modelling of Oil-filled Transformer," International Journal of Mathematical Models and Methods in Applied Sciences, vol. 3, No. 4, 2009, pp. 346-355.

IEEE Std C57.91/2011, IEEE Guide for Loading Mineral-Oil-Immersed Transformers and Step-Voltage Regulators, 106 pages.

US Department of the Interior Bureau of Reclamation, "Permissible Loading of Oil-Immersed Transformers and Regulators," Facilities Engineering Branch, Denver Office, Denver, Colorado, Internet Version 2000.

IEC International Standard IEC 60076-Jul. 2005, "Power transformers—Part 7: Loading guide for oil-immersed power transformers," 2005 (122 pages).

A. van Schijndel, J. Wetzer and P. Wouters, "Forecasting Transformer Reliability," 2006 Annual Report Conference on Electrical Insulatoin and Dielectric Phenomena, 2006, p. 577-582.

* cited by examiner

TEMPERATURE ESTIMATION

1. TECHNICAL FIELD

The subject matter of this document generally relates to temperature estimation. More particularly, and without limitation, the subject matter of this document relates to estimating temperatures at a plurality of sites based on temperature information from a lower number of measurement stations.

2. DESCRIPTION OF THE RELATED ART

There are a variety of situations in which it would be useful to be able to effectively estimate temperatures at a large number of locations. For example, there is interest in developing "smart grid" applications for transformer management, load prediction, and home energy health management. One of the necessary inputs to such applications is reliable temperature information. Most ambient temperature information is regionally-based and assumes a general uniformity across a wide ranging area, such as hundreds to hundreds of thousands of square kilometers. Additionally, the time resolution of such temperature information is often based on periods of a day or half-day interval.

More specific temperature information could be obtained by deploying more sensors and gathering temperature information from them more often but there are practical and economic limitations on such an approach. For example, the necessary capital investment often would outweigh the potential benefits that could be obtained with such an approach.

SUMMARY

An illustrative method of estimating a temperature for at least one of a plurality of sites based on temperature information from at least one of a plurality of temperature measurement stations includes several steps. The sites are clustered into a plurality of clusters. Respective centroids for the clusters are determined. The centroids are associated with respective measurement stations. One of a preselected plurality of estimating techniques is respectively assigned to the measurement stations. The assigned estimating technique provides a temperature estimate at the measurement station that is more accurate than others of the preselected plurality of estimating techniques. A temperature at one or more of the plurality of sites is estimated using the estimating technique assigned to the measurement station associated with the centroid of the cluster that includes the site of interest.

In an example method having one or more features of the method of the previous paragraph, the clustering comprises: determining a set of parameters that affect ambient temperature at the sites, determining which of the sites has parameters related to the parameters of another one of the sites, and clustering the sites together that have related parameters.

In an example method having one or more features of the method of either of the previous paragraphs, the set of parameters includes geographic location, elevation, and proximity to a heat reservoir.

In an example method having one or more features of the method of any of the previous paragraphs, the clustering comprises: weighting at least one of the parameters differently than at least one other of the parameters; and determining which of the clusters one of the sites should be included in by taking into account the weighting of the parameters.

In an example method having one or more features of the method of any of the previous paragraphs, there are more sites than measurement stations.

In an example method having one or more features of the method of any of the previous paragraphs, the associating comprises: establishing a scope of coverage for each measurement station, wherein the scopes of coverage correspond to a geographic area in which temperature information from the measurement station is useful for temperature information; and determining which scope of coverage includes one of the centroids as the associated measurement station for the one of the centroids.

In an example method having one or more features of the method of any of the previous paragraphs, the assigning comprises: using the preselected plurality of estimating techniques, respectively, to obtain at least one temperature estimate for at least one of the stations; determining which one of the used techniques provides a temperature estimate that is closer to a corresponding actual temperature of the station compared to others of the used techniques; and assigning the one of the techniques to the station.

In an example method having one or more features of the method of any of the previous paragraphs, the assigning comprises: estimating the temperature for a station at each of at least one or more distinct times; obtaining actual temperature information for each of the at least one or more distinct times; determining a variation between the estimated temperature and the actual temperature for at least one of the distinct times; and identifying the technique that has a lowest average variation between the estimated and actual temperatures for the at least one of the distinct times.

An illustrative temperature-estimating device includes a data storage and a processor associated with the data storage. The processor uses temperature information from at least one of a plurality of temperature measurement stations for estimating a temperature for at least one of a plurality of sites. The processor is configured to cluster the sites into a plurality of clusters and to determine respective centroids for the clusters. The processor is configured to associate the centroids with measurement stations, respectively. One of a preselected plurality of estimating techniques is respectively assigned to the measurement stations. The processor uses the assigned estimating technique for providing a temperature estimate at the measurement station that is more accurate than others of the preselected plurality of estimating techniques. The processor is configured to estimate a temperature at the at least one of the plurality of sites using the estimating technique assigned to the measurement station associated with the centroid of the cluster that includes the site of interest.

In an example device having one or more features of the device of the previous paragraph, the processor is configured to cluster the sites by: determining a set of parameters that affect ambient temperature at the sites; determining which of the sites has parameters related to the parameters of another one of the sites; and clustering the sites together that have related parameters.

In an example device having one or more features of the device of either of the previous paragraphs, the set of parameters includes geographic location, elevation, and proximity to a heat reservoir.

In an example device having one or more features of the device of any of the previous paragraphs, the processor is configured to cluster the sites by: weighting at least one of the parameters differently than at least one other of the parameters; and determining which of the clusters one of the sites should be included in by taking into account the weighting of the parameters.

In an example device having one or more features of the device of any of the previous paragraphs, there are more sites than measurement stations.

In an example device having one or more features of the device of any of the previous paragraphs, the processor is configured to associate the centroids with the measurement stations by: establishing a scope of coverage for each measurement station, wherein the scopes of coverage correspond to a geographic area in which temperature information from the measurement station is useful for temperature information; and determining which scope of coverage includes one of the centroids as the associated measurement station for the one of the centroids.

In an example device having one or more features of the device of any of the previous paragraphs, the processor is configured to assign the estimating techniques to the measurement stations by: using the preselected plurality of estimating techniques, respectively, to obtain at least one temperature estimate for at least one of the stations; determining which one of the used techniques provides a temperature estimate that is closer to a corresponding actual temperature of the station compared to others of the used techniques; and assigning the one of the techniques to the station.

In an example device having one or more features of the device of any of the previous paragraphs, the processor is configured to assign the estimating techniques to the measurement stations by: estimating the temperature for a station at a distinct time; obtaining actual temperature information for the distinct time; determining a variation between the estimated temperature and the actual temperature; and identifying the technique that has a lowest average variation between the estimated and actual temperatures for the distinct time.

An illustrative non-transitory storage medium includes computer-executable instructions to: cluster a plurality of sites into a plurality of clusters; determine respective centroids for the clusters; associate the centroids with respective measurement stations; assign one of a preselected plurality of estimating techniques respectively to the measurement stations, wherein the assigned estimating technique provides a temperature estimate at the measurement station that is more accurate than others of the preselected plurality of estimating techniques; and estimate a temperature for at least one of the plurality of sites using the estimating technique assigned to the measurement station associated with the centroid of the cluster including at least one of the plurality of sites.

In an example embodiment having one or more features of the non-transitory storage medium of the previous paragraph, the instructions to cluster the sites include instructions to: determine a set of parameters that affect ambient temperature at the sites, determine which of the sites has parameters related to the parameters of another one of the sites, and cluster the sites together that have related parameters.

In an example embodiment having one or more features of the non-transitory storage medium of either of the previous paragraphs, the instructions to associate the centroids with the measurement stations include instructions to: establish a scope of coverage for each measurement station, wherein the scopes of coverage correspond to a geographic area in which temperature information from the measurement station is useful for temperature information; and determine which scope of coverage includes one of the centroids as the associated measurement station for the one of the centroids.

In an example embodiment having one or more features of the non-transitory storage medium of any of the previous paragraphs, the instructions to assign the estimating techniques to the measurement stations include instructions to: use the preselected plurality of estimating techniques, respectively, to obtain at least one temperature estimate for at least one of the stations; determine which one of the used techniques provides a temperature estimate that is closer to a corresponding actual temperature of the station compared to others of the used techniques; and assign the one of the techniques to the station.

Various embodiments and their features will become apparent to those skilled in the art from the following detailed description of at least one example embodiment. The drawings that accompany the detailed description can be briefly described as follows.

DETAILED DESCRIPTION

Figure 1:
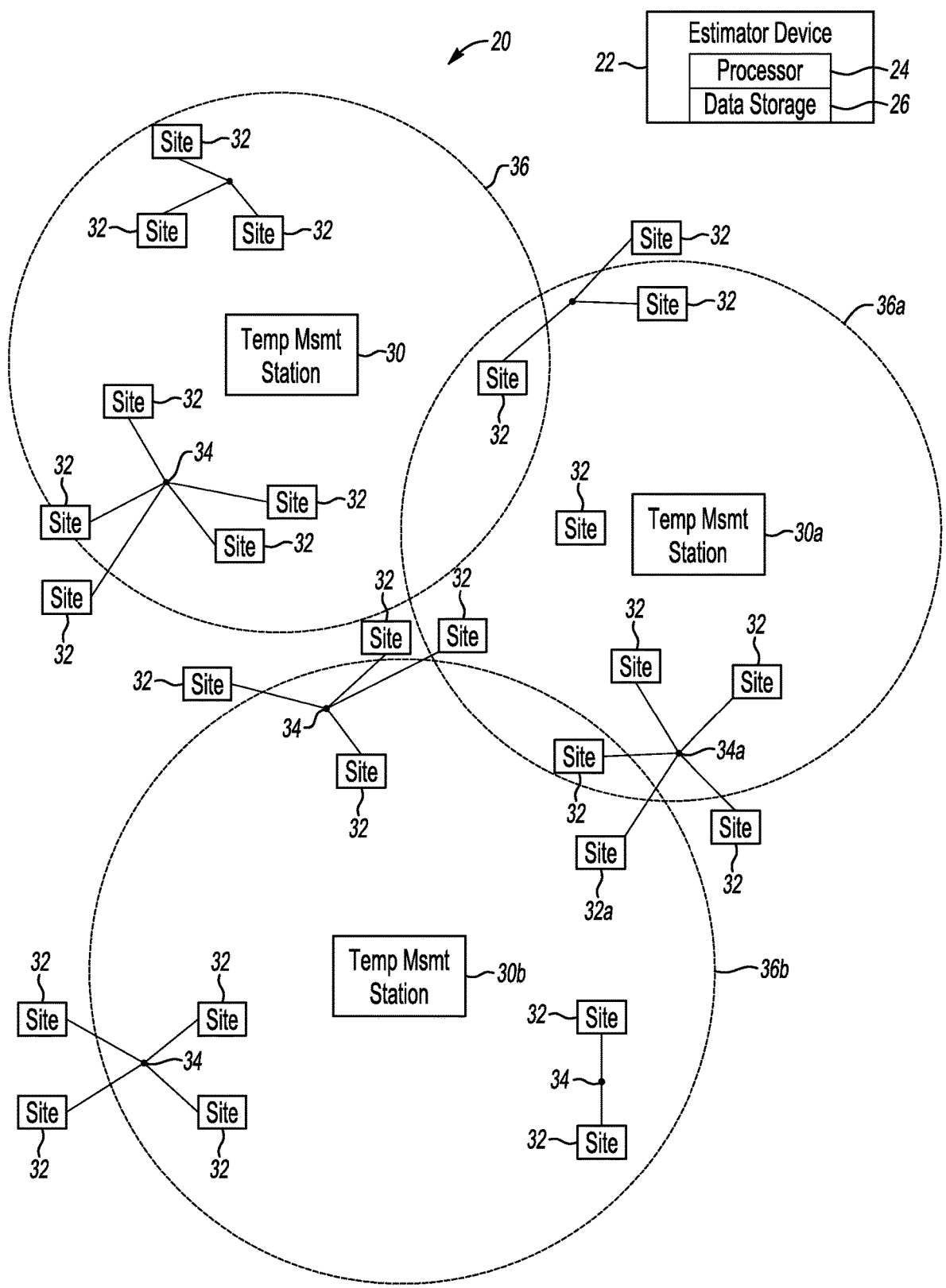
FIG. 1 schematically illustrates an example system for estimating a temperature at any of a plurality of sites based on information from at least one measurement station.

FIG. 1 schematically illustrates a system 20 that is useful for estimating temperatures with temporal and spatial specificity. An estimator device 22 includes a processor 24 that is configured to execute at least one temperature estimation algorithm and a data storage 26 that contains information used by the processor for temperature estimation. The schematic illustration represents the processor 24 as a single unit and the data storage 26 as a single unit for discussion purposes only. An embodiment of the estimator device may be realized through a plurality of computing resources, such as computers and servers. The form of the estimating device 22 may vary and the resources may be in a single location or be distributed, such as through a cloud computing system, among various locations.

The data storage 26 may include programming for the processor 24, such as computer-executable instructions that the processor 24 executes for providing temperature estimates. Alternatively, the processor 24 may include its own memory portion that contains such programming or instructions.

The estimator device 22 in this example obtains information regarding actual ambient temperatures as measured by a plurality of temperature measurement stations 30. The actual temperature information may be used by the processor 24 in real time or may be stored in the data storage 26 for later use by the processor 24. Based on the actual temperature information from the stations 30, the estimator device 22 provides ambient temperature estimates for each of a plurality of sites 32.

FIG. 1 schematically represents a potential geographic distribution of the sites 32 and the stations 30. As can be appreciated from the illustration, the number of sites 32 exceeds the number of measurement stations. The sites 32 are clustered together in clusters of sites that are expected to have the same or very similar ambient temperature conditions. Each of the clusters has a centroid schematically shown at 34. The stations 30 have respective areas or cells 36 that correspond to a geographic region in which the measured temperature information from that station is considered useful for estimating an ambient temperature.

The illustrated system 20 allows for estimating the ambient temperature at any or all of the sites 32 at particular times for a variety of purposes.

Figure 2:
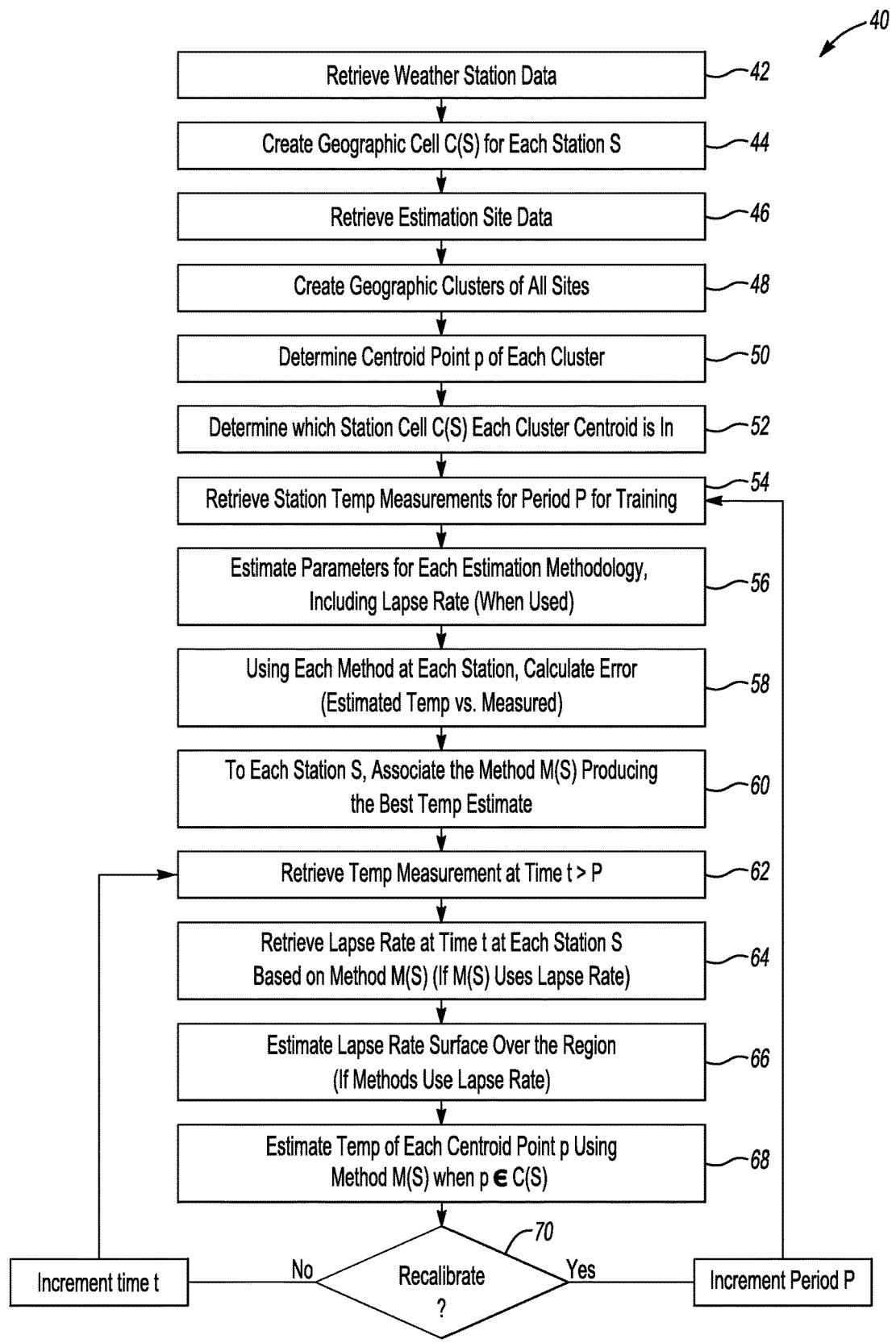
FIG. 2 is a flowchart diagram summarizing an example temperature estimation technique.

FIG. 2 includes a flow chart diagram 40 that summarizes an example approach for estimating ambient temperatures at any or all of the sites 32. Measurement information is obtained from the stations 30 at 42. The information obtained at 42 may be stored in the data storage 26. The station information includes at least an ambient temperature measurement at each of a series of times. Other useful information may also be obtained at 42, such as relative humidity and wind. The information from the stations 30 may be used for training the system 20, estimating ambient temperatures, or both.

At 44 the geographic cells or areas 36 are established. In one example, a known technique is used for determining how to set the boundaries or ranges of the cells 36. One example includes using a Voronoi diagram approach for establishing the cells 36. Station cell definition or description information is stored in the data storage 26. In some examples the processor 24 is configured to make station cell boundary determinations while in others another processor makes the boundary determinations.

At 46, information is gathered regarding the sites 32 where temperature estimates may be desired or useful. The gathered information in this example includes geographic location information (e.g., longitude and latitude), elevation information (e.g., vertical position relative to sea level), sun exposure (e.g., primarily southern exposure or northern exposure), wind pattern information, and proximity to any local heat reservoirs (e.g., bodies of water). The information regarding the sites 32 corresponds to one or more parameters that influence the ambient temperature conditions of a respective site compared to the conditions at another site.

The information gathered at 46 is useful for clustering the sites at 48. Each cluster in FIG. 1 includes at least one site 32. Clustering in this example associates sites with each other based on one or more parameters (e.g., the information gathered at 46) that affect the ambient temperature at the sites 32 so that the sites 32 in each cluster are likely to have approximately the same ambient temperature. Information associating each of the sites 32 with a cluster is stored in the data storage 26.

In some example embodiments the parameters are weighted so that at least one considered parameter has more significance than at least one other for purposes of clustering similar sites together. For example, elevation may have more of an influence on temperature differences than geographic proximity in some regions and elevation may be weighted to have more significance for such a region. Consider three sites with two of them being on the side of separate mountains, respectively, and a third between them in a valley between the mountains. The two mountainside sites are further apart from each other than either is from the site in the valley yet the ambient temperatures at the mountainside sites may be closer to each other than to the ambient temperature at the valley site. In such a situation, the mountainside sites may be in one cluster and the valley site may be in another cluster even though the valley site is closer (in terms of longitude and latitude) to each of the mountainside sites than the latter are to each other. In other words, in the example scenario, elevation differences are weighted more significantly (i.e., considered more influential or important) than the geographic distance between sites. Other situations may benefit from a different weighting of such parameters.

A centroid for each cluster is determined at 50. In some examples, the centroid is an approximation of a positional average of at least a majority of sites 32 within the cluster. The positional average in some embodiments may be considered a center of balance of the cluster sites or a geographic center of gravity of the cluster sites. Some centroid locations are based on the parameter or parameters that are most likely to impact the similarity of ambient temperature at the sites of that cluster. For example, a centroid location at an elevation that corresponds to an average elevation of the sites in the cluster may be preferred over a centroid location that is based on respective distances from the sites if the latter is at an elevation that may experience noticeably different temperature conditions than the average elevation of the sites in that cluster. In some embodiments, the centroid may be one of the cluster sites that is determined to be representative of other cluster sites. Other embodiments may include other techniques for locating the centroids of the clusters, respectively, and different techniques may be used to locate different centroids within the same system.

At 52 a determination is made regarding which cell 36 to associate with each centroid 34. This information is stored in the data storage 26. In one aspect, temperature estimation methodology from the station 30 corresponding to the cell 36 that includes the location of the centroid is considered the best for estimating the temperature at that centroid 34. The temperature estimate for a cluster centroid 34 is used in this example as an estimate of the temperature at all of the sites clustered together in the associated cluster.

An example embodiment includes associating a centroid with a cell based on similarity of characteristics that would likely yield a similar (or similarly varying) temperature estimate. Such characteristics include relative proximity, elevation, heat reservoir proximity, and other meteorologically impacting characteristics. This association can be accomplished by any of a variety of clustering schemes based on these characteristics.

Some embodiments include the assumption that the temperature estimation methodology that yields the best temperature estimate at the station in training would also produce the best estimate of cluster centroids with similar characteristics.

In the example of FIG. 1, at least one of the centroids 34*a* is situated geographically within the cell 36*a* of one station 30*a* while at least one site 32*a* of that cluster is geographically situated within the cell 36*b* of another one of the stations 30*b*. In this case the method of estimation at the station 30*a* is considered best for the temperature estimate at the site 32*a* because the centroid 34*a* is within the cell or area 36*a* even though the site 32*a* is within the cell 36*b*.

In some embodiments it may be more computationally efficient to perform the steps at 48-52 by clustering sites to measurement stations, then to further cluster each station's sites into local clusters and then to determine the centroids of the local clusters.

The process of FIG. 2 includes a training phase that begins at 54 where a history of temperature measurement information of the temperature measurement stations 30 is obtained from the data storage 26 or another database. Some examples include a season's worth of data and others include up to a year's worth of actual temperature measurement data for the estimations at 56. A measurement station 30 is selected for training and the actual measurement data for that selected station 30 are left out of the estimation process at 56. In the illustrated example embodiment at least one parameter is determined for each of a plurality of preselected temperature estimation algorithms at 56. Parameters for the temperature estimation algorithms are estimated from the measurements at other stations 30 at a plurality of times, such as multiple times during a diurnal period to capture variations over the course of a day. In some embodiments the parameters comprise statistical modeling parameters, which are quantities that may be adjusted to best describe the data for a selected statistical model. Lapse rate is one example parameter and other parameters include exponents and weights used in the statistical model. Those skilled in the art who have the benefit of this description will be able to determine which parameters are useful for their selected statistical model. While a spatial interpolation estimation technique is used as part of the illustrated example embodiment, other estimation techniques, such as meteorologically-based techniques to estimate the temperature at many points and times from measurements at a few points, may be useful.

Each of the temperature estimation algorithms is then used at 56 to estimate a temperature at the selected station 30 based on the historical data of nearby stations to identify or select a temperature estimation algorithm that provides results that are closest to the actual temperature at that station. The parameters at each of the plurality of times are optimized to give the closet estimate to the actual temperature measured at the station.

The parameters of the statistical model are optimized in this example by choosing the parameters to minimize the cross-validation error. In this embodiment, lapse rate appears linearly in the statistical models, so lapse rate is optimized first. This approach may yield an analytic expression for lapse rate in terms of the other parameters. This is well known for linearly-appearing terms when cross-validation error is minimized. So this optimal expression for lapse rate can be substituted in the models for lapse rate.

Expressing the lapse rate as an optimized parameter in this manner yields a statistical model in terms of the remaining parameters, since lapse rate has been eliminated from the expression. Now, the cross-validation error can be minimized over the remaining parameters. When there is only one remaining parameter, one embodiment includes doing this using an interval search method to find the value of the parameter in the interval that results in the smallest cross-validation error. When there are multiple remaining parameters, other methods are available for optimizing functions over higher dimensional parameter spaces.

At 58 the error is determined for each of the methods. At 60 the most accurate estimation algorithm is assigned to or associated with the selected station 30 and that algorithm will be used for later temperature estimations at cluster centroids 34 within the cell 36 of that station 30. The training process described above may then be repeated for training each or any of the remaining stations 30 in a similar manner.

Known spatial interpolation techniques may be used in some embodiments as part of the preselected algorithms used for temperature estimations during the training phase. There are known interpolation techniques that are useful for estimating the value of a continuous field at any point using a discrete number of nearby observations of the field. One limitation, however, is that there is no known way of consistently or reliably determining how the various factors that affect estimation error performance introduce an error into an estimation. Embodiments of the approach shown in FIG. 2, therefore, include applying multiple temperature estimation techniques for estimating the temperature at each of the stations 30 and determining which of those techniques provides the best results for a particular station. In some embodiments every station may have a different assigned estimation algorithm than the other stations while in other embodiments many of the stations may have the same assigned algorithm.

According to one embodiment, the temperature estimate for each of a plurality of periods is compared to the actual temperature measurement for each period at a station. The estimation algorithm that provides the lowest average error (e.g., square of the difference between actual temperature and estimated temperature, or an $L_2$ error) over all time periods is assigned to future temperature estimates for that station. One example includes determining a lower bound that is provably the closest that any of the estimation algorithms could achieve. That lower bound is then compared to the estimated results to determine the lowest average difference for selecting the associated estimation algorithm for that station.

The general form of the estimation techniques used in one embodiment can be expressed as $$\theta^*(r,t) = \Sigma_{N \in N(r,t)} w_n(r,t)[\theta_n(t) - \beta(r,t)z_n] + \beta(r,t)z(r).$$

wherein r is a location of interest (e.g., a measurement station 30 selected for training), which may be specified by longitude and latitude or other two-dimensional geo-coordinates;

R is a region in which r is located;

N(r,t) is the set of measurement stations within and around region R at which the temperature measurements are used to estimate the temperature at location r at time t, which allows for some weather stations not being involved in an estimate or not providing measurements at the same time as other weather stations or for the case in which some measurements might be missing;

z(r) is the elevation (e.g., above mean sea level) of the location r (i.e., $z(r_n)$ is the elevation at the $n^{th}$ location r);

$\theta_n(t)$ is the ambient temperature measured at time t at the $n^{th}$ station boated at $r_n$;

$\theta^*(r,t)$ is the estimate of the ambient temperature at location r at time t;

$\beta(r,t)$ is the lapse rate of decrease of temperature with elevation at location r at time t; and $w_n(r,t)$ is the weight assigned to the temperature measured at the $n^{th}$ station at time t for estimating temperature at location r.

In this example, the lapse rate $\beta(r,t)$ is a parameter introduced to capture the rate of decrease of temperature with elevation. The lapse rate has time dependence because it may change over the course of a day. The lapse rate also has location dependence because it may vary by location. One embodiment includes obtaining the lapse rate and other modeling parameter values by minimizing cross-validation error. Some embodiments do not include lapse rate information but it is believed that elevation-related lapse rate information increases accuracy.

With the stations' estimation algorithms assigned at 60, the system 20 is configured to provide temperature estimates at any site 32 of interest. Given sufficient information regarding a site 32 of interest, the processor 24 identifies the centroid 34 of the cluster that includes the site 32 of interest. That information allows the processor 24 to identify the cell 36 that includes the location of the appropriate centroid 34. The temperature measurements from all stations 30 at a time of interest are obtained at 62. In some embodiments all station ambient temperature measurements at a given time are used, although measurements from stations closer to the site may be included with a greater weight than those from further away.

At 64 all parameters for the assigned estimation algorithm for each station 30, including the lapse rate if used, are retrieved for each of the stations 30 involved in the estimation of interest and a lapse rate surface is estimated over the entire region of interest at 66. The processor 24 provides the temperature estimate for the site 32 of interest at 68.

The temperature estimate may then be used for a desired purpose, such as providing temperature information to estimate electrical grid transformer aging or utility customer loading. Those skilled in the art that have the benefit of this description will realize how a temperature estimate obtained in a manner consistent with the techniques of this disclosure may be useful information for other situations.

The example of FIG. 2 includes a recalibration feature. At 70, the processor uses a programmed strategy to determine whether system recalibration is desired or needed. For example, the models may be recalibrated seasonally to update parameters best suited to each season. If the processor 22 should initiate recalibration, the steps from 54 to 60 are repeated to determine whether any updates or changes to the techniques used for estimating the temperature at any of the centroids 34 should be made. If recalibration is not needed, the process returns to the step schematically represented at 62 where the next temperature estimate of interest may begin at an appropriate time.

The above-described approach to estimating temperatures allows for using actual temperature measurement information from stations 30 to provide estimates for a larger number of sites 32. The disclosed techniques provide spatial and temporal specificity in a reliable and robust manner. The type of temperature estimates that may be achievable from the disclosed techniques allow for estimating temperatures at a relatively large number of diverse locations with confidence that the estimate may be used for particular purposes that depend on reasonably accurate temperature information when it is impractical to obtain actual temperature measurements at each of the sites of interest.

The preceding description is illustrative rather than limiting in nature. Variations and modifications to the disclosed examples may become apparent to those skilled in the art that do not necessarily depart from the essence of the contribution to the art provided by the disclosed embodiments. The scope of legal protection can only be determined by studying the following claims.

We claim:

1. A method of estimating a temperature for at least one of a plurality of sites based on temperature information from at least one of a plurality of temperature measurement stations, the method comprising an estimator device:
   clustering the plurality of sites into a plurality of clusters;
   determining a centroid for each cluster;
   associating each centroid with a measurement station;
   assigning one of a preselected plurality of estimating techniques respectively to the measurement stations, wherein the assigned estimating technique provides a temperature estimate at the measurement station that is more accurate than others of the preselected plurality of estimating techniques for the measurement station, and wherein lapse rate is a parameter of the assigned estimating technique; and
   estimating a temperature at the at least one of the plurality of sites using the estimating technique assigned to the measurement station associated with the centroid of the cluster including the at least one of the plurality of sites.

2. The method of claim 1, wherein the clustering comprises
   determining a set of parameters that affect ambient temperature at the sites;
   determining which of the sites has parameters related to the parameters of another one of the sites; and
   clustering the sites together that have related parameters.

3. The method of claim 2, wherein the set of parameters includes geographic location, elevation, and proximity to a heat reservoir.

4. The method of claim 2, wherein the clustering comprises
   weighting at least one of the parameters differently than at least one other of the parameters; and
   determining which of the clusters one of the sites should be included in by taking into account the weighting of the parameters.

5. The method of claim 1, wherein there are more sites than measurement stations.

6. The method of claim 1, wherein the associating comprises
   establishing a scope of coverage for each measurement station, wherein the scopes of coverage correspond to a geographic area in which temperature information from the measurement station is useful for temperature information; and
   determining which scope of coverage includes one of the centroids as the associated measurement station for the one of the centroids.

7. The method of claim 1, wherein the assigning comprises
   using the preselected plurality of estimating techniques, respectively, to obtain at least one temperature estimate for at least one of the stations;
   determining which one of the used techniques provides a temperature estimate that is closer to a corresponding actual temperature of the station compared to others of the used techniques; and
   assigning the one of the techniques to the station.

8. The method of claim 7, wherein the assigning comprises
   estimating the temperature for a station at each of at least one or more distinct times;
   obtaining actual temperature information for each of the at least one or more distinct times;
   determining a variation between the estimated temperature and the actual temperature for at least one of the distinct times; and
   identifying the technique that has a lowest average variation between the estimated and actual temperatures for the at least one of the distinct times.

9. A temperature estimating device, comprising:
   a data storage; and
   a processor configured to
   cluster a plurality of sites into a plurality of clusters;
   determine respective centroids for the clusters;
   associate the centroids with respective measurement stations;
   assign one of a preselected plurality of estimating techniques respectively to the measurement stations, wherein the assigned estimating technique provides a temperature estimate at the measurement station that is more accurate than others of the preselected plurality of estimating techniques for the measurement station, and wherein lapse rate is a parameter of the assigned estimating technique; and estimate a temperature for at least one of the plurality of sites using the estimating technique assigned to the measurement station associated with the centroid of the cluster including the at least one of the plurality of sites.

10. The device of claim 9, wherein the processor is configured to cluster the sites by
    determining a set of parameters that affect ambient temperature at the sites;
    determining which of the sites has parameters related to the parameters of another one of the sites; and
    clustering the sites together that have related parameters.

11. The device of claim 10, wherein the set of parameters includes geographic location, elevation, and proximity to a heat reservoir.

12. The device of claim 10, wherein the processor is configured to cluster the sites by
    weighting at least one of the parameters differently than at least one other of the parameters; and
    determining which of the clusters one of the sites should be included in by taking into account the weighting of the parameters.

13. The device of claim 9, wherein there are more sites than measurement stations.

14. The device of claim 9, wherein the processor is configured to associate the centroids with the measurement stations by
    establishing a scope of coverage for each measurement station, wherein the scopes of coverage correspond to a geographic area in which temperature information from the measurement station is useful for temperature information; and
    determining which scope of coverage includes one of the centroids as the associated measurement station for the one of the centroids.

15. The device of claim 9, wherein the processor is configured to assign the estimating techniques to the measurement stations by
    using the preselected plurality of estimating techniques, respectively, to obtain at least one temperature estimate for at least one of the stations;
    determining which one of the used techniques provides a temperature estimate that is closer to a corresponding actual temperature of the station compared to others of the used techniques; and
    assigning the one of the techniques to the station.

16. The device of claim 15, wherein the processor is configured to assign the estimating techniques to the measurement stations by
    estimating the temperature for a station at a distinct time;
    obtaining actual temperature information for the distinct time;
    determining a variation between the estimated temperature and the actual temperature; and
    identifying the technique that has a lowest average variation between the estimated and actual temperatures for the distinct time.

17. A non-transitory storage medium comprising computer-executable instructions to:
    cluster a plurality of sites into a plurality of clusters;
    determine respective centroids for the clusters;
    associate the centroids with respective measurement stations;
    assign one of a preselected plurality of estimating techniques respectively to the measurement stations, wherein the assigned estimating technique provides a temperature estimate at the measurement station that is more accurate than others of the preselected plurality of estimating techniques for the measurement station, wherein the estimating technique assigned to a first one of the measurement stations is different than the estimating technique assigned to a second one of the measurement stations; and
    estimate a temperature for at least one of the plurality of sites using the estimating technique assigned to the measurement station associated with the centroid of the cluster including the at least one of the plurality of sites.

18. The non-transitory storage medium of claim 17, wherein the instructions to cluster the sites include instructions to
    determine a set of parameters that affect ambient temperature at the sites;
    determine which of the sites has parameters related to the parameters of another one of the sites; and
    cluster the sites together that have related parameters.

19. The non-transitory storage medium of claim 17, wherein the instructions to associate the centroids with the measurement stations include instructions to
    establish a scope of coverage for each measurement station, wherein the scopes of coverage correspond to a geographic area in which temperature information from the measurement station is useful for temperature information; and
    determine which scope of coverage includes one of the centroids as the associated measurement station for the one of the centroids.

20. The non-transitory storage medium of claim 17, wherein the instructions to assign the estimating techniques to the measurement stations include instructions to
    use the preselected plurality of estimating techniques, respectively, to obtain at least one temperature estimate for at least one of the stations;
    determine which one of the used techniques provides a temperature estimate that is closer to a corresponding actual temperature of the station compared to others of the used techniques; and
    assign the one of the techniques to the station.

* * * * *